United States Patent Office 3,315,441
Patented Apr. 25, 1967

3,315,441
PROCESS FOR SEPARATING AMMONIA FROM METHYL CHLORIDE
David G. Hutton and William S. Murray, Wilmington, Del., and Anthony F. Benning, deceased, late of Woodstown, N.J., by Jerome A. Benning, administrator, St. Paul, Minn., assignors to E. I. du Pont de Nemours and Company, Wilmington, Del., a corporation of Delaware
No Drawing. Filed July 15, 1965, Ser. No. 472,364
9 Claims. (Cl. 55—56)

This invention relates to a process for separating ammonia from mixtures thereof with methyl chloride, particularly by the use of a highly effective and readily regeneratable ammonia absorbing liquid medium.

Methyl chloride is used to prepare tetramethyl lead by reacting with active lead as described for example by Jarvie et al. in U.S. Patent 3,048,610, Tullio in U.S. Patents 3,072,694 and 3,072,695, Cook et al. in U.S. Patent 3,049,558 and Silversmith and Sloan in British Patent 949,925.

R. L. Pedrotti and C. A. Sandy, in their copending application, Ser. No 293,138, filed July 5, 1963, describe still another process for making tetramethyl lead by the use of ammonia to catalyze the methyl chloride-monosodium lead alloy reaction. Thus, unreacted methyl chloride, recovered from the reaction mass, contains ammonia, and sometimes water, tetramethyl lead and other volatile reaction mass components. It is often desirable to remove ammonia and recover the tetramethyl lead from the methyl chloride before recycling it for use in the above methylation reaction. Various methods are known for removing ammonia from vapor compositions. None, however, are entirely satisfactory for the present purpose. For example, Halley et al., in U.S. Patent 3,149,918, disclose that ammonia can be recovered from gases containing it, such as coke oven gas and the like, by washing the gas with water or with sulfuric acid or by contacting it with solid boric acid. However, the use of sulfuric acid or other acids is relatively expensive, entailing large quantities and destroys the tetramethyl lead content. Furthermore, to recover the ammonia from the resulting ammonium salt (ammonium sulfate) requires additional costly treatment. Also, the separation of ammonia from the methyl chloride by distillation is unsatisfactory since ammonia and methyl chloride, particularly under prolonged contact, tend to react to form methylamine hydrochlorides with significant material loss and fouling of the equipment. Further, the use of various liquid absorbents for this separation, such as glycerin, propylene glycol and butanediols, in general do not selectively remove ammonia without dissolving substantial quantities of tetramethyl lead and methyl chloride. Solid absorbents, such as molecular sieves, tend to promote the methyl chloride ammonia reaction, while others, such as acid ion exchange resins, destroy tetramethyl lead.

It is an object of this invention to provide an improved process for separating ammonia from gaseous mixtures thereof with methyl chloride. A further object is to provide such a process which also removes other contaminants from the methyl chloride. A particular object is to provide such a process which employs a liquid medium which is highly effective to selectively absorb ammonia from gaseous mixtures of ammonia and methyl chloride, and which does not destroy valuable components of the mixture. Another object is to provide such a process employing an ammonia absorbing liquid which is simple and economical to prepare and to regenerate. Other objects are to advance the art. Still other objects will appear hereinafter.

The above and other objects may be accomplished by the process of this invention which comprises (A) Contacting from about 50 to about 1,000 vapor volumes of a gaseous mixture consisting essentially of a major proportion of methyl chloride and a minor proportion of ammonia.

(B) With about 1 liquid volume of a brine which consists essentially of a liquid solution in water of from about 35% to about 45% by weight of lithium chloride to absorb the ammonia in the brine.

(C) At a temperature of from about $+15°$ C. to about $+30°$ C.

(D) And at a pressure of from about 1 to about 5 atmospheres, and (E) Separating the gaseous methyl chloride from the liquid brine.

It has been found that the lithium chloride brines as above defined are highly effective under the above recited conditions to selectively absorb the ammonia ($NH_3$) from the gaseous mixtures thereof with methyl chloride. Such brines do not absorb, dissolve or destroy significant amounts of methyl chloride or of other valuable materials, such as tetramethyl lead and toluene which also may be present in such gaseous mixtures. The use of such brines under the defined conditions result in the production of methyl chloride of significantly improved purity containing low limited amounts of water which will vary with the conditions employed. The brines of this invention will absorb significant amounts of dimethyl ether and water which may be present in the gaseous mixture. By operating the process under suitable conditions of temperature and pressure, such impurities as tetramethyl lead, toluene, dimethyl ether, excessive amounts of water, and other relatively high boiling materials may be condensed in the form of a separate liquid phase or phases which can be recovered and thus removed from the gaseous mixture, thereby further improving the purity of the methyl chloride. The ammonia is absorbed in the brines in a form which permits it to be released and desorbed from the brines by heating the ammonia-containing brines at suitable higher temperatures and under atmospheric or reduced pressure, thereby producing substantially pure ammonia and regenerating the lithium chloride brines for reuse, particularly after replacing any water lost in the process or in the regenerating step.

The gaseous mixtures, which are to be treated by the process of this invention, will consist essentially of a major proportion of methyl chloride and a minor proportion of ammonia, usually methyl chloride containing from about 0.1% to about 5% by weight of ammonia, and most usually from about 0.5% to about 5% by weight of ammonia. The process of this invention is particularly valuable for use in the treatment of the impure methyl chloride obtained from the manufacture of tetramethyl lead by the reaction of methyl chloride with monosodium lead alloy employing ammonia as a catalyst, such as that described by Pedrotti and Sandy in their copending application, Serial No. 293,138, hereinbefore referred to, whereby the ammonia-methyl chloride mixture may contain other volatile substances, such as entrained water, tetramethyl lead, toluene or other volatile hydrocarbons boiling in the range 90° C. to 150° C., dimethyl ether, and non-condensible gases such as methane and hydrogen. A typical over-all composition, which may be obtained as a vent stream from an ammonia-catalyzed methyl chloride-monosodium lead alloy reaction, consists essentially of about 80% to about 90% methyl chloride, about 0.5% to about 5% ammonia, 0 to about 10% tetramethyl lead (TML), 0 to about 3% toluene, 0 to about 0.5% dimethyl ether, and 0 to about 3% water, all in percent by weight. Such vent stream may be treated by the process of this invention, or it may be combined with methyl chloride vapors recovered from the steam distillation of a methyl chloride-monosodium lead alloy reaction mass, which vapors may typically consist of methyl chloride about 34%, TML about 27%, toluene about 7%, methane about 1%, dimethyl ether about 1%, air about 12%, and water about 19%. A typical combined composition consists of methyl chloride about 82%, ammonia about 1.4%, TML about 8.1%, toluene about 2.4%, methane about 2.1%, hydrogen about 0.1%, toluene about 2.4%, methane about 2.1%, hydrogen about 0.1%, dimethyl ether about 0.4%, air about 1.3% and water about 2.2%, which combined composition may be treated by the process of this invention.

The lithium chloride brine normally will be a concentrated lithium chloride-water solution containing from about 35% to about 45% by weight of lithium chloride, with about 40% preferred. These brines have normal freezing points ranging from —29° C. for 35% LiCl to 24° C. for 45% LiCl, the 40% LiCl brine having a normal freezing point of —5° C. However, these brines supercool readily, i.e. they tend to remain liquid without crystallizing when they are cooled to temperatures well below their normal freezing points. For example, the 40% LiCl brine has been used as a liquid at —15° C.

The amount of the lithium chloride brine employed will depend primarily upon the concentration of the ammonia in the ammonia-methyl chloride mixture. Ordinarily, about 1 liquid volume of the brine will be sufficient to treat from about 50 to about 1,000 vapor volumes of the ammonia-methyl chloride mixture, more usually about 1 liquid volume of brine for from about 50 to about 500 vapor volumes of gaseous mixture which contains from about 0.5% to about 2% by weight of ammonia.

Surprisingly, the lithium chloride brines of this invention are superior to water and other brines, such as calcium chloride, for removing ammonia from and dehumidifying methyl chloride. Surprisingly, too, whereas solid methyl chloride hydrates form rapidly in water at 10° C., they do not appear in the lithium chloride brines of this invention at temperatures as low as about —15° C. Also, while calcium chloride brines tend to form insoluble hydroxides when they absorb ammonia, the lithium chloride brines of this invention do not form insoluble hydroxides when used in the process of this invention. Thus, the lithium chloride brines of this invention (particularly those containing from about 35% to about 40% lithium chloride), because they supercool readily, permit low temperature operation without danger that insoluble by-products, such as hydroxides and hydrates, will form and plug the absorption unit.

The process is easy to carry out, is adapted to batch and continuous operations, and requires no special equipment. It is preferred, nevertheless, to utilize apparatus providing countercurrent scrubbing according to well known principles and techniques for effecting gas-liquid and liquid-liquid contact.

Broadly, the ammonia-methyl chloride composition will be intimately contacted with the lithium chloride brines at ordinary temperatures (25–30° C.) or reduced temperatures (—15° C. to +20° C.) down to the brine freezing point. Preferably, gaseous methyl chloride containing ammonia will be countercurrently scrubbed with 40% LiCl brine at a temperature of from about —15° C. to about +15° C.; the gaseous and liquid temperatures and volumes and the contact time being adjusted so that the resultant purified methyl chloride phase will be at or below about 16° C. and, preferably, will be at about brine temperature. The lower temperatures are particularly advantageous to reduce both the ammonia content and the water content of the methyl chloride and also to remove from the methyl chloride other relatively less volatile substances such as tetramethyl lead, toluene and like hydrocarbons, and dimethyl ether, when they are present.

The pressure may range from about 1 atmosphere up to the methyl chloride condensation pressure, more usually from about 1 to about 5 atmospheres, and preferably from about 1 to about 2 atmospheres. The higher pressures advantageously help reduce the water content, etc. of the resulting deammoniated methyl chloride. Thus, the pressure can be adjusted in accordance with the operating temperatures to minimize the vapor pressure of water and, when present, of other less volatile substances, and thereby decrease their concentration in the methyl chloride phase.

Contact between the gaseous ammonia-methyl chloride mixture and the lithium chloride scrubbing brine can be effected in various ways in single stage or multistage operations. Simple one-stage extraction can be repeated as many times as may be necessary to achieve the desired degree of purification. For example, gaseous ammonia-methyl chloride mixture can be passed through a series of lithium chloride brine scrubbers arranged so that the scrubbing solutions are in increasing order of freshness, the freshest solution being last in the series.

In one particular embodiment, a methyl chloride-ammonia vapor stream, at ordinary atmospheric temperatures and pressures, will be fed to the bottom of an absorption column, while cold 40% lithium chloride brine at about —5° C. to about +10° C. will be fed to the top of the column so that it countercurrently scrubs the ammonia from the methyl chloride. The brine temperature and the gas-liquid contact time are adjusted so that the methyl chloride vapor temperature at the top of the column will be about —5° C. to about +10° C., to keep the methyl chloride-water content below 1000 p.p.m. When the methyl chloride-ammonia composition also contains more than a vapor pressure amount of entrained tetramethyl lead and toluene, such components will condense in the absorber and will be carried along with the cold lithium chloride brine as a second phase. Any tetramethyl lead-toluene phase can be readily separated (as by gravity settling) from the lithium chloride brine. When the methyl chloride-ammonia feed also contains dimethyl ether and excess water, the brine also will remove the ether and the excess water from the methyl chloride.

In another embodiment, the methyl chloride-ammonia stream can be deammoniated in a first stage and dehumidified in a second stage operated at a higher pressure and/or a lower temperature. In the first stage, the methyl chloride-ammonia composition, at substantially atmospheric pressure and at ordinary room temperature, will be countercurrently contacted with a first 40% lithium chloride brine, also at ordinary room temperature. The brine may be fresh solution, or regenerated brine obtained as described below, or the exit stream from the second stage described below. The methyl chloride vapor stream exiting from the first stage scrubber will then be compressed to 2 to 5 atmospheres and cooled to from about 10° C. to about 30° C. Under these conditions, when the methyl chloride-ammonia stream contains tetramethyl lead and toluene, a substantial proportion of such tetramethyl lead and toluene will condense out and may be recovered as a separate phase. Also, some water, that the methyl chloride stream picked up in passing through the brine solution at room temperature and atmospheric pressure, will condense at this stage and may be likewise removed. The compressed and cooled methyl chloride vapor then will be countercurrently contacted in a second stage with a second 40% lithium chloride brine which may be fresh or regenerated and which will normally be at about —5° C. to about 15° C. The liquid and vapor temperatures and the contact times will be such that the methyl chloride stream exiting from the absorber is at a temperature below 15° C., preferably around 0° C., so as to provide methyl chloride that is substantially ammonia-free and that contains less than about 300 p.p.m. water.

When the mixture of ammonia and methyl chloride also contains non-condensible gases, such as methane and hydrogen, such non-condensible gases can be removed by liquefying the methyl chloride, preferably after contacting the mixture with a lithium chloride brine according to the process of this invention, by subjecting the de-ammoniated mixture to appropriate temperatures and pressures such as temperatures of about −5° C. to about 30° C. and about 2.1 to about 5 or more atmospheres, preferably about 20° C. to about 30° C. and above about 4 atmospheres, and, if desired, treating the liquefied methyl chloride with lithium chloride brine.

The ammonia-containing lithium chloride brines, obtained by the process of this invention, can be regenerated for reuse in the process by simple reflux distillation at bottom's temperatures of from about 85° C. to about 140° C. and pressures of from about 100 to about 760 mm. of Hg absolute pressure, preferably at about 90° C. to about 100° C. at 100 mm. of Hg, and at head temperatures which will condense water and return it to the boiler and will permit gaseous ammonia to pass out overhead. For example, on distilling such a brine at 100 mm. absolute pressure and a bottom's temperature of about 85° C., ammonia and dimethyl ether are desorbed and go overhead to the condenser, water refluxes and is returned to the distillation column, while noncondensibles such as methane and hydrogen pass out of the system. After being cooled to the desired temperature and, if necessary, adding water to adjust the concentration of the brine, the lithium chloride brine is ready for reuse as the liquid absorbing medium in the process.

In order to more clearly illustrate this invention, representative modes of carrying it into effect and the results to be obtained thereby, the following examples are given in which the amounts and proportions are by weight and the pressures are atmospheric, except where otherwise clearly indicated.

*Example 1*

Methyl chloride vapor, containing 0.72% by weight ammonia and 0.75% by weight tetramethyl lead, was fed at 25° C. at a rate of 1790 ml./min. into the bottom of a vertically disposed glass column having a 20 mm. inside diameter and packed to a height of 533 mm. with 3.2 mm. glass helices. Simultaneously, a 40% by weight lithium chloride-water solution at 25° C. was fed into the column at the top at a flow rate of 3.7 ml./min. Under steady state operation, the methyl chloride vapor stream exiting from the top of the column contained nil (less than 0.01%) ammonia and substantially all of its tetramethyl lead; the brine exiting from the bottom of the column contained 0.51% by weight ammonia, nil tetramethyl lead and nil methyl chloride.

The ammonia content of the feed and exit methyl chloride was determined by passing samples thereof into aqueous boric acid and titrating the absorbate with 0.1 normal HCl. The brine's ammonia content was determined by direct titration with 0.1 normal HCl. Tetramethyl lead contents were determined by absorption in toluene and titration with iodine.

The recovered brine was deammoniated (to less than 0.01% wt. $NH_3$) by heating to 90–100° C. at 100 mm. Hg pressure in a distillation column equipped with a reflux condenser which permitted ammonia to pass uncondensed and returned most of the water to the boiler. The brine was cooled to room temperature, adjusted to 40% LiCl by weight by adding water, and reused in a substantially identical run to give substantially identical results.

*Example 2*

Methyl chloride vapor, containing 1.51% by weight ammonia, was fed at 28° C. at a flow rate of 3600 ml./min. into a 5 x 1520 cm. upright column packed with 0.46 cm. berl saddles. Cold (−8° C.) 40% by weight lithium chloride brine was countercurrently fed to the top of the column at a rate of 40 ml./min. The 6° C. methyl chloride stream that exited from the top of the column contained substantially nil ammonia and only 570 p.p.m. water.

*Example 3*

The process of Example 2 was repeated under substantially identical conditions, except that
(1) The methyl chloride-ammonia feed was at 23° C. and was fed under pressure such that the column pressure was 2 atmospheres, and
(2) The lithium chloride brine was at 0° C. initially. The resultant methyl chloride stream exited at 16° C., and contained nil ammonia and only 275 p.p.m. water.

*Example 4*

172 ml. of 45% by weight LiCl brine (i.e. water substantially saturated with LiCl) was added to a 1 liter flask containing MeCl (methyl chloride) vapor and connected to a MeCl gas buret such that the MeCl vapor phase above the liquid was always at one atmosphere pressure. Ammonia gas ($NH_3$) was then bubbled through the brine, which was agitated to equilibrate the vapor and liquid phases. At equilibrium (at 25° C. and 1 atmos. pressure), the vapor contained 0.06 gram of $NH_3$/100 grams MeCl when the liquid brine contained 1.0 gram of $NH_3$/100 grams brine solution.

In contrast, when water was used in place of the brine under the same conditions, the vapor contained 0.39 gram $NH_3$/100 grams MeCl when the liquid contained 1.0 gram $NH_3$/100 grams. Thus, the water did not keep the $NH_3$ out of the MeCl nearly as well as the LiCl brine.

When 42% by weight $CaCl_2$ (calcium chloride) brine (i.e. a substantially saturated solution) was used under the same conditions, the vapor contained 0.6 $NH_3$/100 grams MeCl when the liquid contained 1.0 gram $NH_3$/100 grams. In addition, the $CaCl_2$ solution developed a noticeable precipitate, presumably $Ca(OH)_2$. Again, the LiCl brine is a far superior extractant for $NH_3$ in the presence of MeCl.

It will be understood that the foregoing examples are given for illustrative purposes solely and that the invention is not limited to the specific embodiments described therein. On the other hand, it will be apparent to those skilled in the art that, subject to the limitations set forth in the general description, many variations can be made in the mixtures treated, and in the concentrations, proportions, conditions and techniques employed without departing from the spirit or scope of this invention.

From the foregoing description, it will be apparent that this invention provides a new and improved process for treating methyl chloride containing ammonia to separate the ammonia therefrom, employing a highly efficient ammonia absorbing medium. The novel absorbing medium is highly selective for ammonia and does not deleteriously effect methyl chloride and other valuable components of the mixture which may be present therein. Also, by the proper control of the conditions employed, the process and medium can effectively dehumidify the methyl chloride and remove other contaminants therein. The ammonia absorbing medium can be regenerated readily and economically. The process and medium are safe, simple, easy and economical to use. Accordingly, this invention constituttes a valuable advance in and contribution to the art.

The embodiments of the invention in which an exclusive property or privilege is claimed are defined as follows:

1. The process for separating ammonia from mixtures thereof with methyl chloride which comprises
    (A) contacting from about 50 to about 1,000 vapor volumes of a gaseous mixture consisting essentially of a major proportion of methyl chloride and a minor proportion of ammonia (B) with about 1 liquid volume of a brine which consists essentially of a liquid solution in water of from about 35% to about 45% by weight of lithium chloride to absorb the ammonia in the brine (C) at a temperature of from about −15° C. to about +30° C.

(D) and at a pressure of from about 1 to about 5 atmospheres, and (E) separating the gaseous methyl chloride from the liquid brine.

2. The process for separating ammonia from mixtures thereof with methyl chloride which comprises (A) contacting from about 50 to about 1,000 vapor volumes of a gaseous mixture consisting essentially of methyl chloride and from about 0.1% to about 5% by weight of ammonia (B) with about 1 liquid volume of a brine which consists essentially of a liquid solution in water from about 35% to about 45% by weight of lithium chloride to absorb the ammonia in the brine (C) at a temperature of from about −15° C. to about +30° C.

(D) and at a pressure of from about 1 to about 5 atmospheres, and (E) separating the gaseous methyl chloride from the liquid brine.

3. The process for separating ammonia from mixtures thereof with methyl chloride which comprises (A) contacting from about 50 to about 500 vapor volumes of a gaseous mixture consisting essentially of methyl chloride and from about 0.1% to about 5% by weight of ammonia (B) with about 1 liquid volume of a brine which consists essentially of a liquid solution in water of from about 35% to about 45% by weight of lithium chloride to absorb the ammonia in the brine (C) at a temperature of from about −5° C. to about +25° C.

(D) and at a pressure of from about 1 to about 2 atmospheres, and (E) separating the gaseous methyl chloride from the liquid brine.

4. The process for separating ammonia from mixtures thereof with methyl chloride which comprises (A) contacting from about 50 to about 500 vapor volumes of a gaseous mixture consisting essentially of methyl chloride and from about 0.1% to about 5% by weight of ammonia (B) with about 1 liquid volume of a brine which consists essentially of a liquid solution in water of about 40% by weight of lithium chloride to absorb the ammonia in the brine (C) at a temperature of from about −5° C. to about +15° C.

(D) and at a pressure of from about 1 to about 2 atmospheres, and (E) separating the gaseous methyl chloride from the liquid brine.

5. The process for separating ammonia from mixtures thereof with methyl chloride which comprises (A) contacting from about 50 to about 500 vapor volumes of a gaseous mixture consisting essentially of from about 80% to about 90% by weight of methyl chloride, from about 0.5% to about 5% by weight of ammonia, from 0% to about 10% by weight of tetramethyl lead, from 0% to about 3% by weight of toluene, from 0% to about 0.5% by weight of dimethyl ether, and from 0% to about 3% by weight of water, (B) with about 1 liquid volume of a brine which consists essentially of a liquid solution in water of from about 35% to about 45% by weight of lithium chloride to absorb the ammonia in the brine (C) at a temperature of from about −5° C. to about +15° C.

(D) and at a pressure of from about 1 to about 2 atmospheres, and (E) separating the gaseous mixture, substantially free of ammonia and dimethyl ether and most of the water, from the liquid brine.

6. The process for separating ammonia from mixtures thereof with methyl chloride which comprises (A) contacting from about 50 to about 500 vapor volumes of a gaseous mixture consisting essentially of about 82% by weight of methyl chloride, about 1.4% by weight of ammonia, about 8.1% by weight of tetramethyl lead, about 2.4% by weight of toluene, about 2.1% by weight of methane, about 0.1% by weight of hydrogen, about 0.4% by weight of dimethyl ether, about 1.3% by weight of air, and about 2.2% by weight of water, (B) with about 1 liquid volume of a brine which consists essentially of a liquid solution in water of from about 35% to about 45% by weight of lithium chloride to absorb the ammonia in the brine (C) at a temperature of from about −5° C. to about +15° C.

(D) and at a pressure of from about 1 to about 2 atmospheres, and (E) separating the gaseous mixture, substantially free of ammonia and dimethyl ether and most of the water, from the liquid brine.

7. The process for separating ammonia from mixtures thereof with methyl chloride which comprises (A) contacting from about 50 to about 1,000 vapor volumes of a gaseous mixture consisting essentially of a major proportion of methyl chloride and a minor proportion of ammonia (B) with about 1 liquid volume of a brine which consists essentially of a liquid solution in water of from about 35% to about 45% by weight of lithium chloride to absorb the ammonia in the brine (C) at a temperature of from about −15° C. to about +30° C.

(D) and at a pressure of from about 1 to about 5 atmospheres, (E) separating the gaseous methyl chloride from the liquid brine, (F) heating the resulting ammonia-containing brine under reflux at a bottoms temperature of from about 85° C. to about 140° C. under a pressure of from about 100 to about 760 mm. of Hg to desorb the ammonia from the brine and return the water thereto, and (G) recovering substantially ammonia-free brine.

8. The process for separating ammonia from mixtures thereof with methyl chloride which comprises (A) contacting from about 50 to about 1,000 vapor volumes of a gaseous mixture consisting essentially of methyl chloride and from about 0.1% to about 5% by weight of ammonia (B) with about 1 liquid volume of a brine which consists essentially of a liquid solution in water of from about 35% to about 45% by weight of lithium chloride to absorb the ammonia in the brine (C) at a temperature of from about −15° C. to about +30° C.

(D) and at a pressure of from about 1 to about 5 atmospheres, (E) separating the gaseous methyl chloride from the liquid brine, (F) heating the resulting ammonia-containing brine under reflux at a bottoms temperature of from about 85° C. to about 140° C. under a pressure of from about 100 to about 760 mm. of Hg to desorb the ammonia from the brine and return the water thereto, and (G) recovering substantially ammonia-free brine.

9. The process for separating ammonia from mixtures thereof with methyl chloride which comprises (A) contacting from about 50 to about 500 vapor volumes of a gaseous mixture consisting essentially of methyl chloride and from about 0.1% to about 5% by weight of ammonia (B) with about 1 liquid volume of brine which consists essentially of a liquid solution in water of about 40% by weight of lithium chloride to absorb the ammonia in the brine (C) at a temperature of from about $-5°$ C. to about $+15°$ C.

(D) and at a pressure of from about 1 to about 2 atmospheres, (E) separating the gaseous methyl chloride from the liquid brine, (F) heating the resulting ammonia-containing brine under reflux at a bottoms temperature of from about 90° C. to about 100° C. under a pressure of about 100 mm. of Hg to desorb the ammonia from the brine and return the water thereto, and (G) recovering substantially ammonia-free brine.

No references cited.

REUBEN FRIEDMAN, *Primary Examiner.*

C. HART, *Assistant Examiner.*